United States Patent
Kaikkonen et al.

(10) Patent No.: US 9,769,641 B2
(45) Date of Patent: Sep. 19, 2017

(54) METHOD AND APPARATUS FOR SELECTING A NETWORK ACCESS SUBSCRIPTION

(75) Inventors: Jorma Kaikkonen, Oulu (FI); Jussi-Pekka Koskinen, Oulu (FI); Jarkko Koskela, Oulu (FI); Petri Vasenkari, Turku (FI); Hannu Pirila, Littoinen (FI); Sari Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/375,111

(22) PCT Filed: Feb. 22, 2012

(86) PCT No.: PCT/IB2012/050814
§ 371 (c)(1),
(2), (4) Date: Oct. 21, 2014

(87) PCT Pub. No.: WO2013/124708
PCT Pub. Date: Aug. 29, 2013

(65) Prior Publication Data
US 2015/0296363 A1    Oct. 15, 2015

(51) Int. Cl.
*H04W 4/24* (2009.01)
*H04W 48/18* (2009.01)
(Continued)

(52) U.S. Cl.
CPC ........... *H04W 4/24* (2013.01); *H04M 15/56* (2013.01); *H04M 15/77* (2013.01);
(Continued)

(58) Field of Classification Search
CPC ....... H04W 4/24; H04W 48/18; H04W 84/12; H04M 15/77; H04M 15/8351; H04M 15/8055; H04Q 7/20
(Continued)

(56) References Cited

U.S. PATENT DOCUMENTS

| 6,246,870 B1 * | 6/2001 | Dent | H04M 15/00 455/405 |
| 8,868,070 B2 * | 10/2014 | Camilleri | H04W 8/04 455/410 |

(Continued)

FOREIGN PATENT DOCUMENTS

| CN | 2444351 Y | 8/2001 |
| CN | 2696227 Y | 4/2005 |

(Continued)

OTHER PUBLICATIONS

International Search Report received for corresponding Patent Cooperation Treaty Application No. PCT/IB2012/050814 dated Jan. 15, 2013, 5 pages.

(Continued)

*Primary Examiner* — Allahyar Kasraian
*Assistant Examiner* — Farid Seyedvosoghi
(74) *Attorney, Agent, or Firm* — Alston & Bird LLP

(57) ABSTRACT

Various methods for selecting a network access subscription are provided. One example method includes receiving a request to participate in a communications session, determining that at least two subscriptions for network access are available, determining tariffs for one or more connection types that are available through each subscription, 5 determining cost factors for each connection type of the at least two subscriptions based on the tariffs, and selecting a target subscription and a target connection type for use in satisfying the request based on the cost factors. Similar and related example methods and example apparatuses are also provided.

17 Claims, 4 Drawing Sheets

(51) Int. Cl.
*H04M 15/00* (2006.01)
*H04W 84/12* (2009.01)

(52) U.S. Cl.
CPC ..... *H04M 15/771* (2013.01); *H04M 15/8044* (2013.01); *H04M 15/8055* (2013.01); *H04M 15/8351* (2013.01); *H04W 48/18* (2013.01); *H04M 2215/2033* (2013.01); *H04W 84/12* (2013.01)

(58) Field of Classification Search
USPC ....... 455/405, 406, 412, 414, 407, 408, 409, 455/414.4, 466, 445
See application file for complete search history.

(56) References Cited

U.S. PATENT DOCUMENTS

| | | | |
|---|---|---|---|
| 2007/0015536 A1* | 1/2007 | LaBauve | H04L 29/06027 455/552.1 |
| 2008/0056286 A1 | 3/2008 | Forssell et al. | |
| 2008/0101567 A1 | 5/2008 | Baudino et al. | |
| 2009/0149220 A1 | 6/2009 | Camilleri et al. | |
| 2010/0095364 A1 | 4/2010 | Norgaard et al. | |
| 2010/0153228 A1 | 6/2010 | Ahmavaara | |
| 2011/0151832 A1 | 6/2011 | Lai | |
| 2012/0064858 A1* | 3/2012 | Cai | H04L 12/14 455/406 |

FOREIGN PATENT DOCUMENTS

| | | |
|---|---|---|
| CN | 102177740 | 9/2011 |
| CN | 102246492 | 11/2011 |
| EP | 0724371 A1 | 7/1996 |
| EP | 2448301 A1 | 5/2012 |
| KR | 20110056164 A | 5/2011 |
| WO | 03100647 A1 | 12/2003 |
| WO | WO 2005/117524 A2 | 12/2005 |
| WO | 2007105000 A1 | 9/2007 |
| WO | WO 2010/140781 A2 | 12/2010 |
| WO | 2011080637 A1 | 7/2011 |

OTHER PUBLICATIONS

Extended European Search Report for corresponding European Application No. 12869032.8 dated Nov. 27, 2015, 12 pages.
International Written Opinion for corresponding International Application No. PCT/IB2012/050814 dated Jan. 15, 2013.
Gichuki, W. M., *Performance Investigation of Automatic Multiple SIM Card Cell Phones*, A Dissertation submitted to the School of Graduate in partial fulfillment for the award of Master of Science in Computer Science Degree of Makerere University (Oct. 2008).
Office Action for corresponding Chinese Application No. 201280070359.5 dated May 3, 2017, 12 pages.

* cited by examiner

METHOD AND APPARATUS FOR SELECTING A NETWORK ACCESS SUBSCRIPTION

RELATED APPLICATION

This application was originally filed as PCT Application No. PCT/IB2012/050814 filed on Feb. 22, 2012.

TECHNICAL FIELD

Example embodiments of the present invention relate generally to the communications, and, more particularly, relate to methods and apparatuses for selecting a network access subscription.

BACKGROUND

The modern communications era has brought about a tremendous expansion of wireless networks. Various types of networking technologies have been developed resulting in unprecedented expansion of telephony and data networks, fueled by consumer demand. Wireless and mobile networking technologies have addressed related consumer demands, while providing more flexibility and immediacy of information transfer.

Mobility has proven to be an important catalyst to the wide-spread utilization of wireless devices. While it has become typical for different service providers to support continued connectivity when a device moves between service areas, different tariffs or charging schemes may be utilized. For example, in a home service area talk minutes for a voice call may count against a monthly allotment that is associated with a subscription, but in another service area, where the device is roaming, talk minutes for the subscription may be charged additional fees. Further, communications via a data connection may also be charged differently in a home area relative to an area where the device is roaming.

BRIEF SUMMARY

Example methods and example apparatuses for selecting a network access subscription are provided. One example method may include receiving a request to participate in a communications session, determining that at least two subscriptions for network access are available, determining tariffs for one or more connection types that are available via the two or more subscriptions, determining cost factors for the one or more connection types of the at least two subscriptions based on the tariffs, and selecting a target subscription and a target connection type for use in satisfying the request based on the cost factors.

An additional example embodiment is an apparatus comprising at least one processor and at least one memory including computer program code. The at least one memory and the computer program code may be configured to, with the at least one processor, direct the example apparatus to perform various functionality. In this regard, the example apparatus may be directed to perform receiving a request to participate in a communications session, determining that at least two subscriptions for network access are available, determining tariffs for one or more connection types that are available via the two or more subscriptions, determining cost factors for the one or more connection types of the at least two subscriptions based on the tariffs, and selecting a target subscription and a target connection type for use in satisfying the request based on the cost factors.

Another example embodiment is an example non-transitory computer readable medium having computer program code stored thereon. When executed, the computer program may direct an apparatus to perform receiving a request to participate in a communications session, determining that at least two subscriptions for network access are available, determining tariffs for one or more connection types that are available via the two or more subscriptions, determining cost factors for each connection type of the at least two subscriptions based on the tariffs, and selecting a target subscription and a target connection type for use in satisfying the request based on the cost factors.

Another example embodiment is an apparatus comprising means for receiving a request to participate in a communications session, means for determining that at least two subscriptions for network access are available, means for determining tariffs for one or more connection types that are available via the two or more subscriptions, means for determining cost factors for each connection type of the at least two subscriptions based on the tariffs, and means for selecting a target subscription and a target connection type for use in satisfying the request based on the cost factors.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
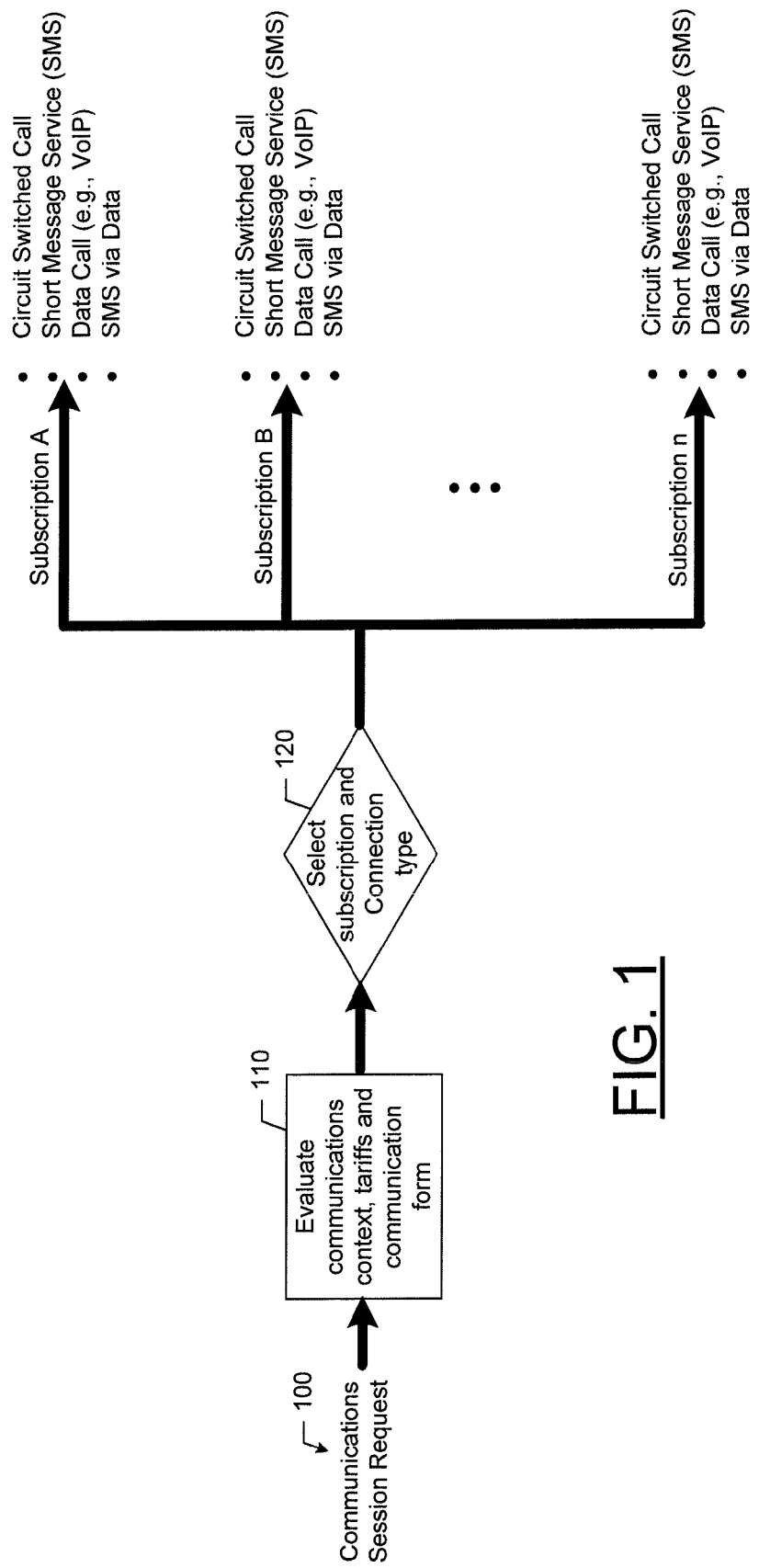
FIG. 1 illustrates an example flow diagram for selecting a subscription and session type according to various example embodiments.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device. The term "video" as used herein may be construed to include only video, or video with audio.

According to various example embodiments, methods and apparatuses are provided herein that perform or support the selection of a network access subscription based on a various criteria. A network access subscription may permit a mobile device to access a network based on network access credential information that may be stored in association with the subscription. In accordance with various example embodiments, this network access credential information may provide configuration settings and/or other information enabling a mobile device to access an operator network via, for example, a voice connection or a data connection. In this regard, the network access credential information may comprise security information to access an operator network, but may also encompass personal user information, network settings information, service-related information, and/or the like. The network access credential information may, for example, comprise, access credentials, cryptographic algorithm(s), network settings, service information, configuration information, and/or the like. In some example embodiments, the provisioned network access credential information may comprise Subscriber Identity Module (SIM) data and may comprise an application (for example, a SIM application) or other software that may be installed on a mobile device. In some example embodiments wherein the network access credential information comprises SIM data, the SIM data may, for example, comprise a soft SIM, a fixed SIM, a removable or non-removable universal subscriber identity module (USIM), a soft USIM, a fixed USIM, a removable user identity module (R-UIM), and/or the like. Further, in some example embodiments, a single SIM may be associated with multiple subscriptions.

Via a subscription, such as one that is associated with a SIM, a device may gain access to a network via various connection types, including, but not limited to, a voice connection type and a data connection type. A voice connection may utilize communications techniques and protocols that are common in wireless or cellular telephony networks. For example, a voice connection may be a circuit switched (CS) connection that supports mobile originated (MO) or mobile terminated (MT) voice calls. A voice connection may also support communications as short message service (SMS) communications.

Alternatively or additionally, a subscription may provide for a device to access a network via a data connection. The data connection may be packet-based and utilize various packet-based protocols and techniques for communicating data. For example, a data connection may be based in $3^{rd}$ generation or $4^{th}$ generation-Long Term Evolution (LTE) technology. Alternatively, a data connection may be established using in wireless local area network (WLAN) technology. A data connection may be used to support both text-based and voice communications using techniques such as SMS via data and Voice over Internet Protocol (VoIP). As such, in some instances, data connections can be used as an alternative to a voice connection since either can support similar applications (for example, voice calls and text receipt/transmission).

A subscription may also be associated with a set of tariffs or costs for conducting communications via the subscription. The tariff that is used to determine a cost factor for a given communications session may be determined based on a communications context of a mobile device. The communications context may be based on a number of parameters including the particular network or networks that are currently accessible to the mobile device. Based on the communications context, particular subscriptions may be available for use when establishing a connection to a network and associated tariffs may apply based on the characteristics of the network, the type of connection, and the subscription. Each subscription may have a first tariff for communications session with a home network and a second tariff for communications sessions when the device is roaming on a foreign network. As such, each subscription for a given mobile device may have a different home network and therefore costs for communications may be reduced if the mobile device selects and uses a subscription that identifies the currently connected network as a home network. Further, tariffs may be separately set for voice connections and data connections, and since either of these connection types may support particular applications (for example, voice call or text receipt/transmission), the tariff and a resultant cost factor for a communications session that is based on the tariffs may be used to determine which connection type to utilize.

Figure 2:
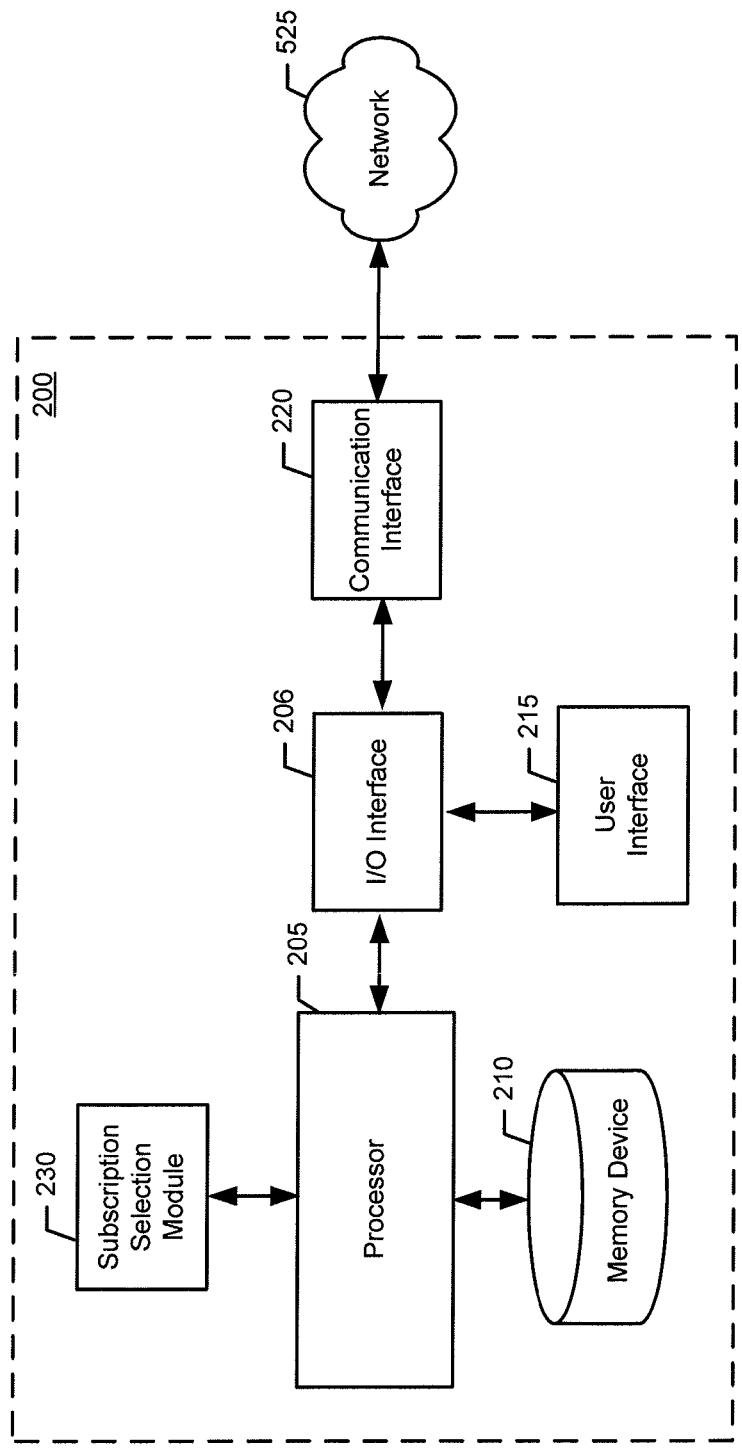
FIG. 2 illustrates a block diagram of an example apparatus configured to select a network access subscription according to various example embodiments.

In some example embodiments, a mobile device, such as the apparatus 200 in FIG. 2, may be configured to use multiple network access subscriptions for connecting to one or more networks via various connection types. As mentioned above, each subscription may have associated tariffs for the types of connections that may be used under the subscription based on the communications context of the mobile device. For example, a mobile device may have a first subscription that is coupled with a first SIM, and a second subscription that is coupled with a second SIM. Based on the tariffs associated with each of the SIMs, a mobile terminal may be configured to determine which SIM and connection type to use when accessing the network to establish a communications session. According to some example embodiments, a request for a communications session using a particular type of connection associated with a first SIM may be intercepted and terminated to allow for establishment of a new communications session via a second SIM using a different type of connection that results in a reduction in the cost factor for subsequent communications.

The Common PCN (Personal Communications Network) Handset Specification (CPHS) describes the ability of a device to use of multiple subscriptions in the form of SIMs via an Alternative Line Service. The Alternative Line Service may permit a mobile device to be assigned two alternate lines, albeit in association with a single international mobile subscriber identity (IMSI). As such, a mobile device may be configured to make and receive voice calls on each of the lines associated with their respective SIMs and the lines may be separately charged and billed. Each line may be associated with a separate directory number (for example, a separate Mobile Subscriber Integrated Services Digital Network Number (MSISDN)) and a separate subscription. As mentioned above, each SIM, and therefore each line, may be associated with tariffs for connection types with a home network and tariffs for connection types with networks where the SIM is considered roaming.

Mobile devices that are configured to implement multiple subscriptions to perform selection of subscriptions and connection types based on cost may utilize multiple SIMs that, for example, are stored on respective cards and inserted in respective slots on the mobile device. According to example embodiments, the use of multiple subscriptions may bring flexibility to a device that permits the device to efficiently operate at a lower cost through analysis of the communications context of the device and the tariffs that would be applied to prospective communications sessions. In some example embodiments, quality of service may also be considered when selecting a subscription and connection type. Accordingly, a mobile device having multiple subscriptions with respective tariffs may be configured to select a subscription and connection type for use in establishing a communications session for, for example, a mobile originated call, a mobile terminated call, an SMS message, a data call, or the like. Further, in some example embodiments, to achieve cost savings through selection of a subscription and connection type, the mobile device may consider a subscription and connection type prioritization (possibly user configured), which indicates, based on the communications context of the mobile device, an order in which subscriptions and connection types should be considered for use.

In accordance with some example embodiments, when a mobile device receives a voice call (for example, a CS call) to a line associated with a subscription that is in a roaming condition (for example, as determined based on the communications context), the mobile device may be configured evaluate the currently applicable tariffs to determine that the recipient mobile device should provide an option for a user to choose not to answer, but rather initiate a new call to the originating device via another subscription (for example, using another SIM card) and connection type that is more cost effective (for example, a call via VoIP on a data connection). Prior to terminating the original request for a communications session, the mobile device may determine the identity of the originating device (and any other information needed to establish a communications session with the originating device) and then discontinue further signaling, possibly without incurring any charges associated with use of the roaming subscription. In an alternative example, for mobile originated CS communications and mobile originated/mobile terminated data calls, a mobile device may be configured to automatically select a subscription and connection type that is most cost effective, rather than request user input before transitioning to another subscription and connection type. Additionally, if, for example, a WLAN-based data connection is available with no tariff for use, then a data connection associated with a subscription for the WLAN may be selected and used as the most cost effective option.

FIG. 1 is a process flow diagram for selecting a subscription and a connection type in accordance with various example embodiments. At 100, a communication session request is received. The request may originate locally within a device, such as in the case of a mobile originated call, or remotely, such as in the case of a mobile terminated call. Regardless, of the manner in which the request is created and received, the request may be processed by the mobile device to determine a subscription and connection type for handling the request as described herein.

At 110, the mobile device may evaluate the communications context, the tariffs for the various available subscriptions, and a communication form associated with the request. With respect to evaluating the communications context of the mobile device, the device may be configured to identify the various networks that are available for the device establish a connection with. For example, the communications context may indicate that the mobile device may establish a connection with a base station of a cellular telephony network and a wireless router for a WLAN network.

Based on the communications context, tariffs for each of the subscriptions may be identified and considered. For example, for a given cellular telephony network and a subscription, tariffs can be identified that would be applicable for a voice connection and tariffs can be identified for a data connection. In this manner each of the applicable tariffs for communications with the network can be identified and evaluated as possibilities for conducting communications.

Further, the communication form may be evaluated. The communication form may be, for example, voice or text. As described above, a voice call may be performed using either a voice connection or a data connection, and a text message may also be transmitted or received via a voice connection or a data connection. Accordingly, the form of the communication can be evaluated in view of the tariffs to determine a cost factor for the prospective communications session for use in selecting a subscription and connection type associated with the cost factor and tariff.

At 120, the mobile device may be configured to select the subscription and a connection type. As indicated above, the selection may be based on the cost factors that are determined for each connection type and subscription. In some example embodiments, the quality of service for a given connection may also be evaluated as a criterion for the selection.

Upon selecting a subscription and a connection type, a communications session may be established using the network access credential information for the selected subscription. Further, in some instances where the communications session request at 100 was a remotely originated request involving a given subscription (for example, a CS call to a line associate with a particular SIM), the mobile device may select an alternative subscription (and possibly an alternative connection type). As such, the signaling associated with the incoming request may be terminated by the mobile device, and the mobile device may be configured to establish another communications session with the requesting device using the selected alternative subscription (and possibly an alternative connection type).

FIG. 1 illustrates that the mobile device may have any number of subscriptions to select from. Subscriptions A and B, as provided in FIG. 1, each have various options for connection types and communications forms. For example, a communications session for a selected subscription may configured for a CS call, an SMS message, a voice over data call (for example, VoIP), or an SMS via data message. Each of the possibilities can be evaluated in view of the respective tariffs for the subscription and the connection type to determine a minimum cost factor, and a selection of a target subscription and a target connection type may be made.

Figure 3:
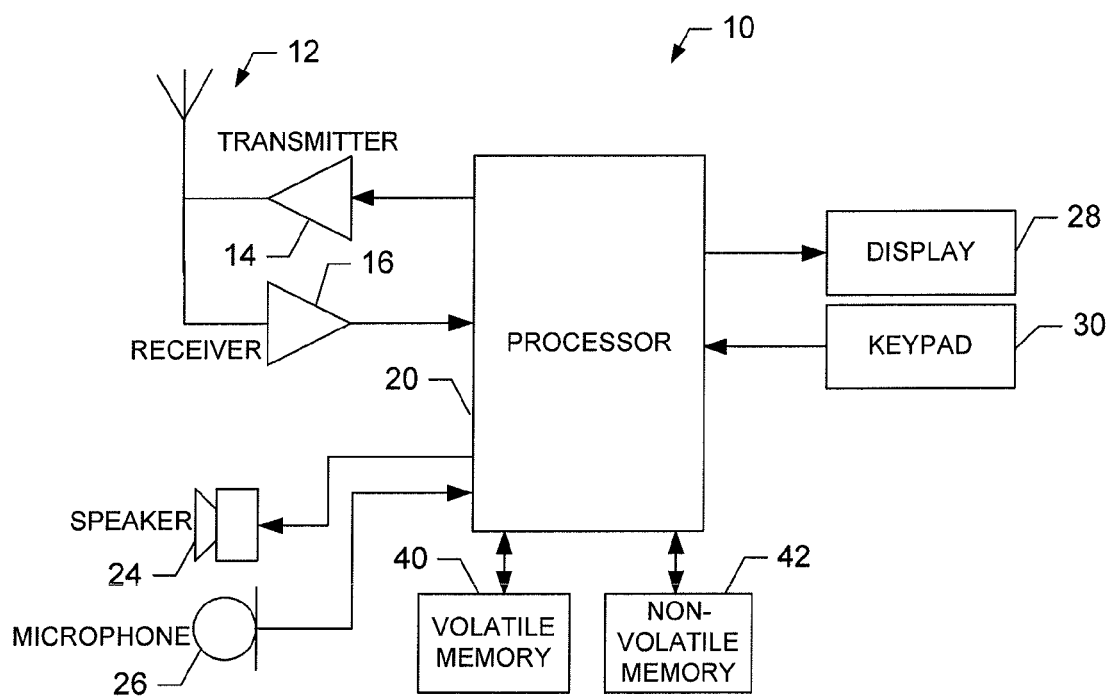
FIG. 3 illustrates a block diagram of an example mobile terminal configured to select a network access subscription according to various example embodiments.
Figure 4:
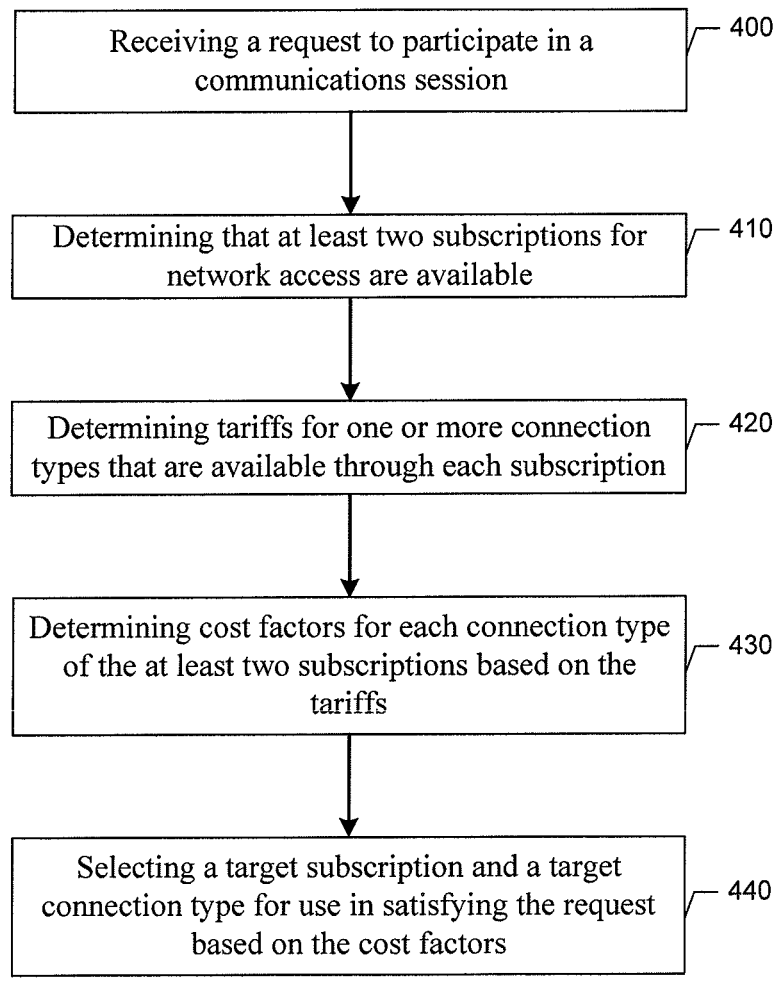
FIG. 4 illustrates a flowchart of an example method for selecting a network access subscription according to various example embodiments.

The description provided above and generally herein illustrates example methods, example apparatuses, and example computer programs stored on a non-transitory computer readable media for selecting a network access subscription. FIGS. 2 and 3 illustrate example apparatus embodiments configured to perform the various functionalities described herein. FIG. 2 depicts an example apparatus that is configured to perform various functionalities as described with respect to FIG. 1 and as generally described herein. FIG. 3 depicts an example apparatus in the form of a more specific mobile terminal configured to perform various functionalities as described with respect to FIG. 1 and as generally described herein. The example apparatuses depicted in FIGS. 2 and 3 may also be configured to perform example methods of the present invention, such as those described with respect to FIG. 4.

Referring now to FIG. 2, in some example embodiments, the apparatus 200 may, be embodied as, or included as a component of, a communications device with wired and/or wireless communications capabilities. In some example embodiments, the apparatus 200 may be part of a communications device, such as a stationary or a mobile terminal. As a mobile terminal, the apparatus 200 may be a mobile computer, mobile telephone, a portable digital assistant (PDA), a pager, a mobile television, a gaming device, a mobile computer, a laptop computer, a camera, a video recorder, an audio/video player, a radio, smart phone, tablet or pad device and/or a global positioning system (GPS) device, any combination of the aforementioned, or the like. Regardless of the type of communications device, apparatus 200 may also include computing capabilities.

The example apparatus 200 may includes or is otherwise in communication with a processor 205, a memory device 210, an Input/Output (I/O) interface 206, a communications interface 220, user interface 215, and a subscription selection module 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (for example, oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions or computer program code stored on a non-transitory computer-readable storage medium, the instructions specifically configure the processor 205 to perform the algorithms and operations described herein (for example, those described with respect to FIGS. 1 and 4). In some example embodiments, the processor 205 is a processor of a specific device (for example, a mobile terminal) configured for employing example embodiments of the present invention by further configuration of the processor 205 via executed instructions for performing the algorithms, methods, and operations described herein.

The memory device 210 may be one or more non-transitory computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (for example, hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210, which may be one or more memory devices, may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205. In some example embodiments, the memory device 210 may store subscription information including network access credential information for one or more subscriptions. The subscriptions may be based on SIMs of various types, as described above.

The I/O interface 206 may be any device, circuitry, or means embodied in hardware, software, or a combination of hardware and software that is configured to interface the processor 205 with other circuitry or devices, such as the communications interface 220 and the user interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 220 may be any device or means (for example, circuitry) embodied in hardware, a computer program product, or a combination of hardware and a computer program product that is configured to receive and/or transmit data from/to a network 225 and/or any other device or module in communication with the example apparatus 200. The communications interface may be configured to communicate information via any type of wired or wireless connection, and via any type of communications protocol, such as a communications protocol that supports cellular communications or near field communications. According to various example embodiments, the communication interface 220 may be configured to support the transmission and reception of communications in a variety of networks including, but not limited to Internet Protocol-based networks (for example, the Internet), cellular networks, or the like. Further, the communications interface 220 may be configured to support device-to-device communications, such as in a mobile ad hoc network (MANET). Processor 205 may also be configured to facilitate communications via the communications interface 220 by, for example, controlling hardware comprised within the communications interface 220. In this regard, the communication interface 220 may comprise, for example, communications driver circuitry (for example, circuitry that supports wired communications via, for example, fiber optic connections), one or more antennas, a transmitter, a receiver, a transceiver and/or supporting hardware, including, for example, a processor for enabling communications. Via the communication interface 220, the example apparatus 200 may communicate with various other network entities in a device-to-device fashion and/or via indirect communications via a base station, access point, server, gateway, router, or the like.

The user interface 215 may be in communication with the processor 205 to receive user input via the user interface 215 and/or to present output to a user as, for example, audible, visual, mechanical or other output indications. The user interface 215 may include, for example, a keyboard, a mouse, a joystick, a display (for example, a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (for example, software and/or firmware) stored on a memory accessible to the processor 205 (for example, volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The subscription selection module 230 of example apparatus 200 may be any means or device embodied, partially or wholly, in hardware, a non-transitory computer readable medium having a computer program stored thereon, or a combination of hardware and a non-transitory computer readable medium having a computer program stored thereon, such as processor 205 implementing stored instructions to configure the example apparatus 200, or a hardware configured processor 205, that is configured to carry out the functions of the subscription selection module 230 as described herein. In an example embodiment, the processor 205 includes, or controls, the subscription selection module 230. The subscription selection module 230 may be, partially or wholly, embodied as processors similar to, but separate from processor 205. In this regard, the subscription selection module 230 may be in communication with the processor 205. In various example embodiments, the subscription selection module 230 may, partially or wholly, reside on differing apparatuses such that some or all of the functionality of the subscription selection module 230 may be performed by a first apparatus, and the remainder of the functionality of the subscription selection module 230 may be performed by one or more other apparatuses.

The apparatus 200 and the processor 205 may be configured to perform the following functionality via the subscription selection module 230. In some example embodiments, via the subscription selection module 230, the processor 205 may be configured to cause the apparatus 200 to implement the example method of FIG. 4. In this regard, the subscription selection module 230 may be configured to receive a request to participate in a communications session at 400. At 410, the subscription selection module 230 may be further configured to determine that at least two subscriptions for network access are available, and, at 420, determine tariffs for one or more connection types that are available through each subscription. Additionally, at 430, the subscription selection module 230 may be configured to determine cost factors for each connection type of the at least two subscriptions based on the tariffs, and, at 440, select a target subscription and a target connection type for use in satisfying the request based on the cost factors.

Additionally or alternatively, according to some example embodiments, the subscription selection module 230 may be configured to determine that at least two subscriptions for network access are available, where the at least two subscriptions include a first subscription associated with a first subscriber identity module (SIM) and a second subscription associated with a second SIM. Additionally or alternatively, according to some example embodiments, the subscription selection module 230 may be configured to determine that at least two subscriptions for network access are available, where the at least two subscriptions include a wireless local area network (WLAN) subscription. Further, according to some example embodiments, the subscription selection module 230 may be alternatively or additionally configured to determine the tariffs for the one or more connection types, where each of the one or more connection types is a voice connection or a data connection. According to some example embodiments, the subscription selection module 230 may be additionally or alternatively configured to receive the request to participate in the communications session via a first subscription and a first connection type associated with the first subscription, and configured to select a second connection type associated with the second subscription as the target connection type. Additionally or alternatively, the subscription selection module 230, in some example embodiments, may be configured to receive the request to participate in a mobile terminated voice call initiated by a remote device via a first subscription, and select a second subscription as the target subscription and selecting a mobile originated voice over data connection call initiated by a local device. Further, in some example embodiments, the subscription selection module 230 may be configured to receive the request to participate in a voice call via a first subscription and a voice connection associated with the first subscription, select a second subscription as the target subscription, and select a data connection associated with the second subscription as the target connection type.

Referring now to FIG. 3, a more specific example apparatus in accordance with various embodiments of the present invention is provided. The example apparatus of FIG. 3 is a mobile terminal 10 configured to communicate within a wireless network, such as a cellular communications network. The mobile terminal 10 may be configured to perform at least the functionality of the apparatus 200 as described herein. In some example embodiments, the mobile terminal 10 may be caused to perform the functionality of the subscription selection module 230 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface.

As described above, FIGS. 1 and 4 illustrate flowcharts of example systems, methods, and/or computer programs stored on a non-transitory computer readable medium (for example, computer program product) according to some example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a non-transitory computer-readable storage medium having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as processor 205. As will be appreciated, any such program code instructions may be loaded onto a computer or other programmable apparatus (for example, processor 205, memory device 210, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving a request to participate in a communications session, wherein the request to participate in the communications session involves a first network access subscription;
determining that at least two subscriptions for network access are available;
determining separate tariffs for one or more connection types that are available via the at least two subscriptions based on a communications context, wherein the communications context indicates available networks to establish a connection with and the one or more connection types is a voice connection or a data connection;
determining cost factors for the one or more connection types of the at least two subscriptions based on the tariffs; and
selecting a target connection type associated with a target subscription from the at least two subscriptions for use in response to the request to participate in the communications session based on the cost factors so that the received request associated with the first network access subscription is terminated in order to establish another communications session using the selected target connection type associated with the target subscription.

2. The method of claim 1, wherein the at least two subscriptions for network access comprise a first subscription associated with a first subscriber identity module and a second subscription associated with a second subscriber identity module.

3. The method of claim 1, wherein the at least two subscriptions for network access comprise at least one wireless local area network subscription.

4. The method of claim 1, wherein receiving the request includes receiving the request to participate in the communications session via a first subscription and a first connection type associated with the first subscription; and wherein selecting the target subscription and the target connection type includes selecting a second subscription as the target subscription and selecting a second connection type associated with the second subscription as the target connection type.

5. The method of claim 1, wherein selecting a target subscription and a target connection type for use in satisfying the request is based on a prioritized order in which subscriptions and connection types are considered for use.

6. An apparatus comprising:
   at least one processor; and
   at least one memory including computer program code, the at least one memory and the computer program code configured to, with the at least one processor, direct the apparatus at least to:
   receive a request to participate in a communications session, wherein the request to participate in the communications session involves a first network access subscription;
   determine that at least two subscriptions for network access are available;
   determine separate tariffs for one or more connection types that are available via the at least two subscriptions based on a communications context, wherein the communications context indicates available networks to establish a connection with and the one or more connection types is a voice connection or a data connection;
   determine cost factors for the one or more connection types of the at least two subscriptions based on the tariffs; and
   select a target connection type associated with a target subscription from the at least two subscriptions for use in response to the request to participate in the communications session based on the cost factors so that the received request associated with the first network access subscription is terminated in order to establish another communications session using the selected target connection type associated with the target subscription.

7. The apparatus of claim 6, wherein the at least two subscriptions for network access comprise a first subscription associated with a first subscriber identity module and a second subscription associated with a second subscriber identity module.

8. The apparatus of claim 6, wherein the at least two subscriptions for network access comprise at least one wireless local area network subscription.

9. The apparatus of claim 6, wherein the apparatus directed to receive the request includes being directed to receive the request to participate in the communications session via a first subscription and a first connection type associated with the first subscription; and wherein the apparatus directed to select the target subscription and the target connection type includes being directed to select a second subscription as the target subscription and select a second connection type associated with the second subscription as the target connection type.

10. The apparatus of claim 6 further comprising a transmitter and an antenna for transmitting wireless signals during the communications session.

11. The apparatus of claim 6, wherein the apparatus comprises a mobile terminal.

12. The apparatus of claim 6, wherein selecting a target subscription and a target connection type for use in satisfying the request is based on a prioritized order in which subscriptions and connection types are considered for use.

13. At least one non-transitory computer-readable medium having computer program code stored thereon, the computer program code being configured to, when executed, direct an apparatus to at least:
   receive a request to participate in a communications session, wherein the request to participate in the communications session involves a first network access subscription;
   determine that at least two subscriptions for network access are available;
   determine separate tariffs for one or more connection types that are available via the at least two subscriptions based on a communications context, wherein the communications context indicates available networks to establish a connection with and the one or more connection types is a voice connection or a data connection;
   determine cost factors for the one or more connection types of the at least two subscriptions based on the tariffs; and
   select a target connection type associated with a target subscription from the at least two subscriptions for use in response to the request to participate in the communications session based on the cost factors so that the received request associated with the first network access subscription is terminated in order to establish another communications session using the selected target connection type associated with the target subscription.

14. The computer-readable medium of claim 13, wherein the at least two subscriptions for network access comprise a first subscription associated with a first subscriber identity module and a second subscription associated with a second subscriber identity module.

15. The computer-readable medium of claim 13, wherein the at least two subscriptions for network access comprise at least one wireless local area network subscription.

16. The computer-readable medium of claim 13, wherein the program code configured to direct the apparatus to receive the request includes being configured to direct the apparatus to receive the request to participate in the communications session via a first subscription and a first connection type associated with the first subscription; and wherein the program code configured to direct the apparatus to select the target subscription and the target connection type includes being configured to direct the apparatus to select a second subscription as the target subscription and select a second connection type associated with the second subscription as the target connection type.

17. The computer-readable medium of claim 13, wherein selecting a target subscription and a target connection type for use in satisfying the request is based on a prioritized order in which subscriptions and connection types are considered for use.

* * * * *